(12) United States Patent
Berger et al.

(10) Patent No.: US 6,192,390 B1
(45) Date of Patent: Feb. 20, 2001

(54) METHOD FOR THE LOCATION-INDEPENDENT EXCHANGE OF PROCESS DATA USING PROCESS-COMPUTER-INDEPENDENT DATA STRUCTURES

(75) Inventors: Wolfgang Berger, Fussgönheim; Stefan Wietzke, Bochum, both of (DE)

(73) Assignee: ABB Patent GmbH, Mannheim (DE)

(*) Notice: Under 35 U.S.C. 154(b), the term of this patent shall be extended for 0 days.

(21) Appl. No.: 09/123,077

(22) Filed: Jul. 27, 1998

(30) Foreign Application Priority Data

Jul. 25, 1997 (DE) ............................................. 197 32 011

(51) Int. Cl.[7] ...................................................... G06F 15/16
(52) U.S. Cl. ........................ 709/200; 709/200; 709/201; 709/202; 709/203; 709/302; 709/303; 345/526
(58) Field of Search .................................... 709/200–203, 709/302–303, 785; 345/326, 526

(56) References Cited

U.S. PATENT DOCUMENTS

| | | | |
|---|---|---|---|
| 5,247,670 | * 9/1993 | Matsunaga | 709/203 |
| 5,442,791 | * 8/1995 | Wrabetz et al. | 709/104 |
| 5,457,797 | * 10/1995 | Burtterworth | 709/302 |
| 5,557,780 | * 9/1996 | Edwards et al. | 709/500.48 |
| 5,708,828 | * 1/1998 | Coleman | 709/785 |
| 5,884,312 | * 3/1999 | Dustan et al. | 707/10 |
| 5,894,573 | * 4/1999 | Fukasawa et al. | 707/103 |
| 5,928,335 | * 7/1999 | Morita | 709/303 |
| 5,987,497 | * 11/1999 | Allgeier | 709/201 |

* cited by examiner

*Primary Examiner*—Ahmad F. Matar
*Assistant Examiner*—Thu Ha Nguyen
(74) *Attorney, Agent, or Firm*—Herbert L. Lerner; Laurence A. Greenberg; Werner H. Stemer

(57) ABSTRACT

The method relates to the location-independent exchange of process data between application programs (5) and process management systems (4). The process management systems (4) and the application programs (5) are provided in a number of different process computers systems (2.1 to 2.7) which are interconnected via a network (1). The data exchange takes place by using a software system (3) which is called Process Information Broker PIB (3) and has three types of component, namely PIB server (3.1), PIB client (3.2) and PIB services (3.3). The PIB services (3.3) contain a switching service (3.31) and a user administrator (3.32). During the start-up of the system and for the purpose of updating, in the respective computer system (2.1 to 2.7), process data are converted from process-computer-specific data structures into process-computer-independent data structures, typified and provided as stored data in an interface. All the computer systems (2.1 to 2.7) register the process data types provided by them, including the storage location thereof, with the switching service (3.31). The stored process data are accessed by the application programs (5) by involving the switching service (3.31) in order to ask for the offered process data types and their storage location. On this basis, process data types are retrieved and operations executed.

3 Claims, 5 Drawing Sheets

METHOD FOR THE LOCATION-INDEPENDENT EXCHANGE OF PROCESS DATA USING PROCESS-COMPUTER-INDEPENDENT DATA STRUCTURES

SPECIFICATION

The invention relates to a method for the location-independent exchange of process data within one or more technical plants.

During the integration of plant components from different manufacturers and the progressive integration of parts of the business process, an integration of different computer systems is frequently also necessary within a technical plant such as, for example, a power station or the plants of a utility company.

In power stations, for example, the following computer systems are provided:

process computers in automation systems, local computers in automation systems, computers with application programs for process optimization and system management, complete management systems, and accounting and billing systems.

Hitherto, such computer systems have been separate solutions. The exchange of data between them takes place, in part, manually or by means of individual, specially developed connections. Point-to-point connections were implemented and in some cases still are. The creation and maintenance of such systems is expensive and susceptible to faults. There are also disadvantages with respect to other aspects such as, for example, security, expandability and upward-compatibility.

Figure 4:
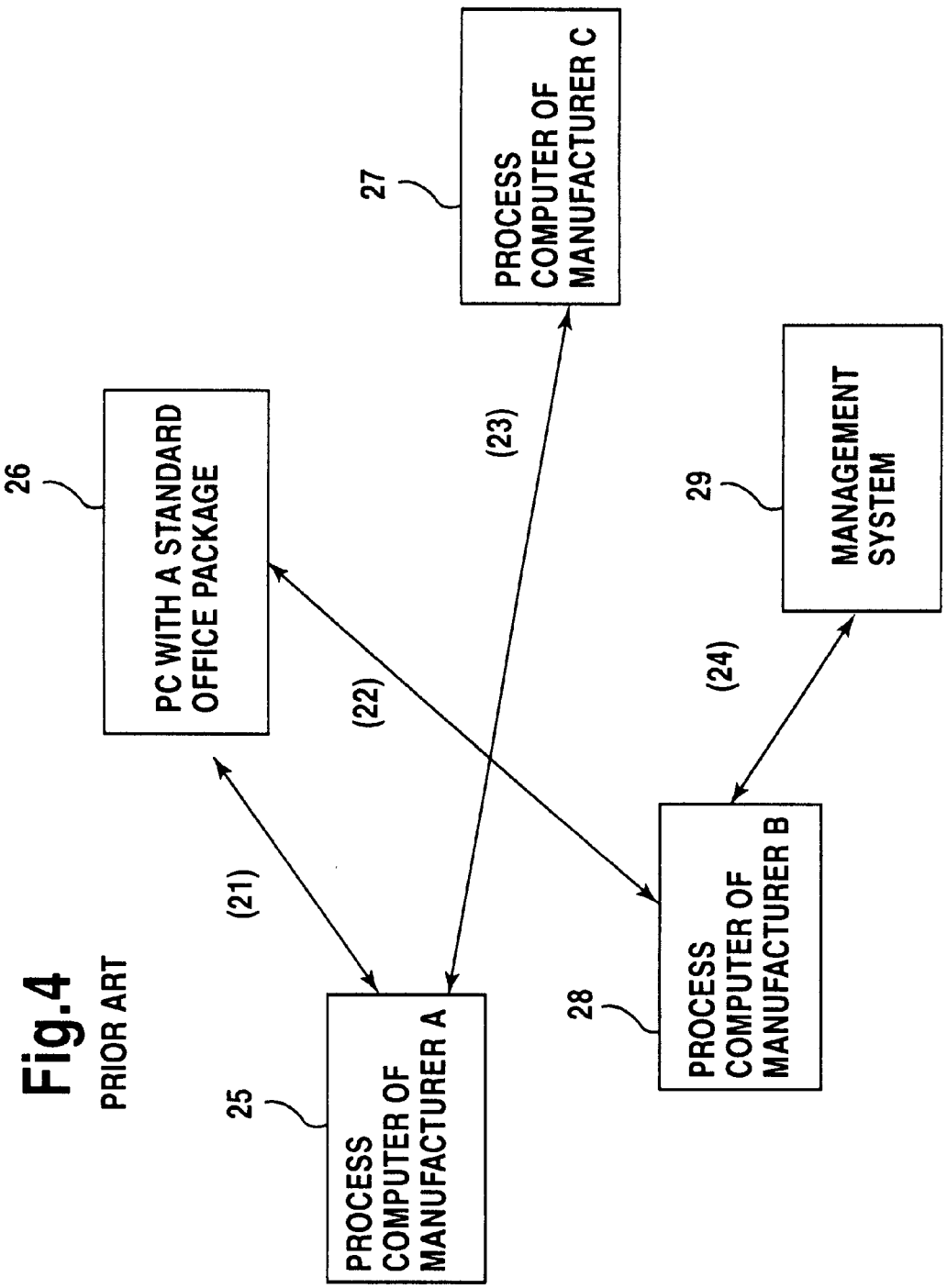

FIG. 4 shows a typical situation in the integration of computers and software packages in a power station. By way of example, four connections 1 to 4 are shown, each of these connections being implemented by a separate mechanism.

Connection 1 between a process computer 1 of a manufacturer A and standard office packages on a PC operates with SQL interfaces with direct access to database tables. The disadvantages with this arrangement are that the structure of the database must be disclosed and only relational databases and the contents stored in them can be interrogated and no event control is possible.

Connection 2 between a process computer 3 of a manufacturer B and standard office packages on a PC operates with file transfer via specially written programs, using generally available file transfer programs. The disadvantages with this arrangement are the slow operation, lack of event orientation and need for a separate parser.

Connection 3 between a process computer 1 of a manufacturer A and a process computer 2 of a manufacturer B operates with communication via the detour of a process control system. This means that a computer system 1 or 3 couples data onto the control system bus via available devices of the control system and another computer extracts them again. The disadvantages are that, for this purpose, drivers must be generally written down to the bottom protocol level, the control system is loaded by the data traffic and the volumes of data which can be exchanged are small.

Connection 4 between a process computer 3 of a manufacturer B and a management system operates with manual data exchange by "copying" the data and entering them again into the destination system. There is no integration in the actual sense of the word in this arrangement.

Figure 5:
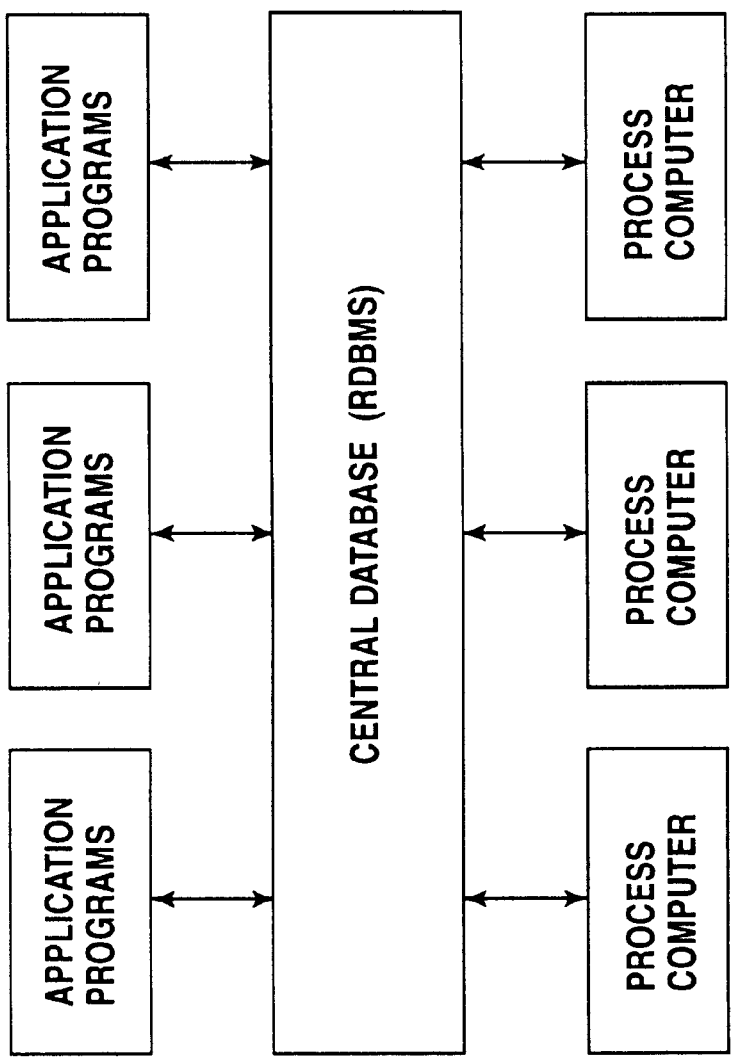

FIG. 5 shows a known approach to a solution, called data integration, for integrating computer systems with decoupling of process computer systems and user programs, and the abovementioned disadvantages being avoided. In this arrangement, a central data base with, for example, a relational data base management system (RDBMS) is provided. In such a method, the exchange of process data takes place in such a manner that the process computers store their process data in central data storage and the application programs access the process data by means of quasi-standardized access mechanisms decoupled in time from this storage process. Disadvantages of this approach to a solution consist in that the data must be edited in such a manner that they can be stored in relational data bases or at least can be retrieved in such a form. The problem of consistency of data is difficult to handle. Event-oriented processing of the data is not possible. Adaptation to a modified business process or work sequence is complex. The internal structure of the process computer systems to be coupled must be known and generally must not change any more. The problem of access protection, especially for writing data into the process computer systems, has not been solved satisfactorily.

The invention is based on the object of specifying a method which is intended for exchanging process data of a number of different process computers and—in contrast to data integration—permits application integration.

This object is achieved by a method for the location-independent exchange of process data having the features specified in claim 1. Advantageous developments are specified in further claims.

Advantages of the method consist, inter alia, in that data interrogations and data inputs are possible at any process computers. There is decoupling of network, process computer system and application programs. All conventional hardware and software platforms can be supported. The expenditure for configuration and commissioning is minimal. Further advantages are the consideration of redundancy concepts, a modular configuration, expandability and general upward-compatibility.

Figure 1:
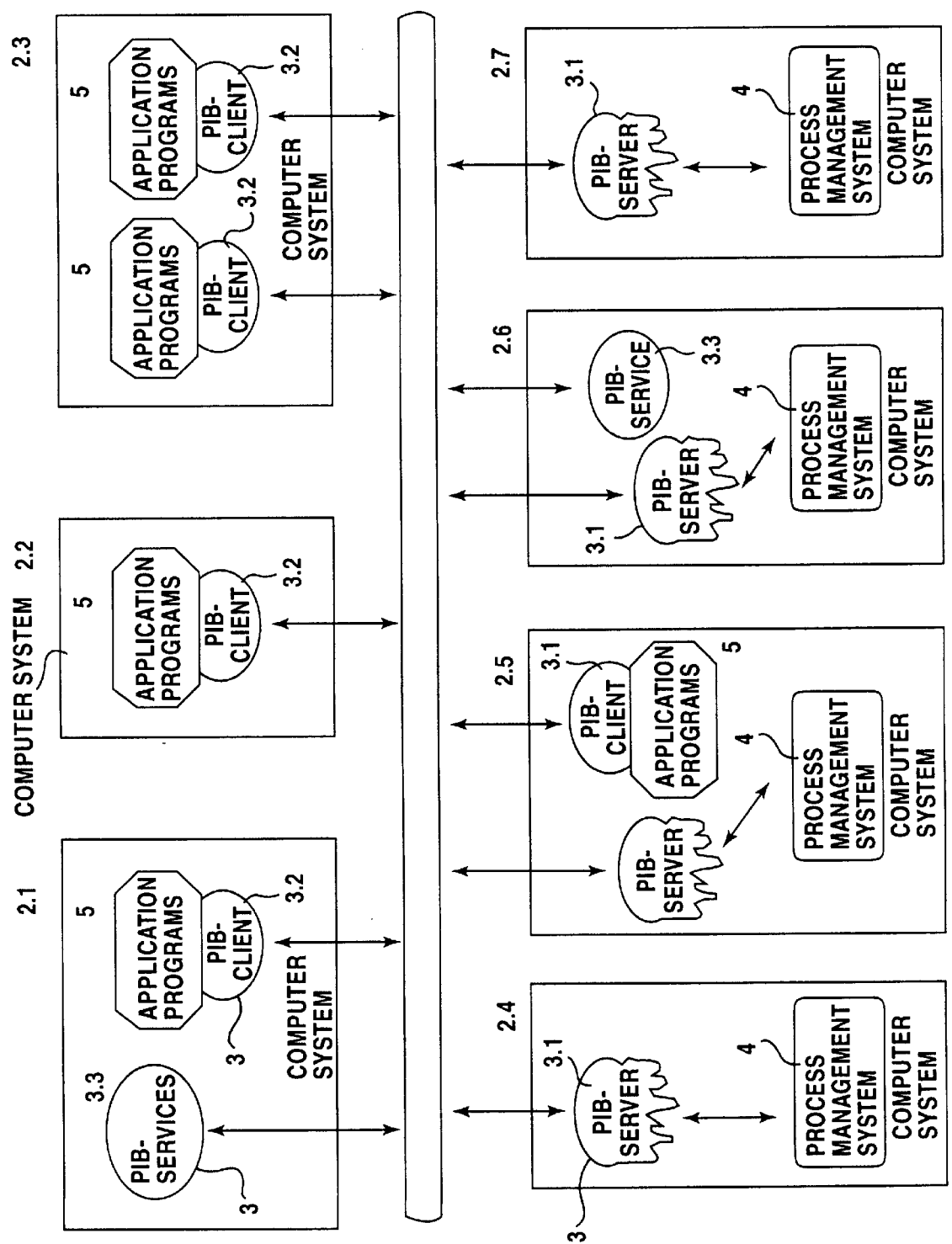
Figure 2:
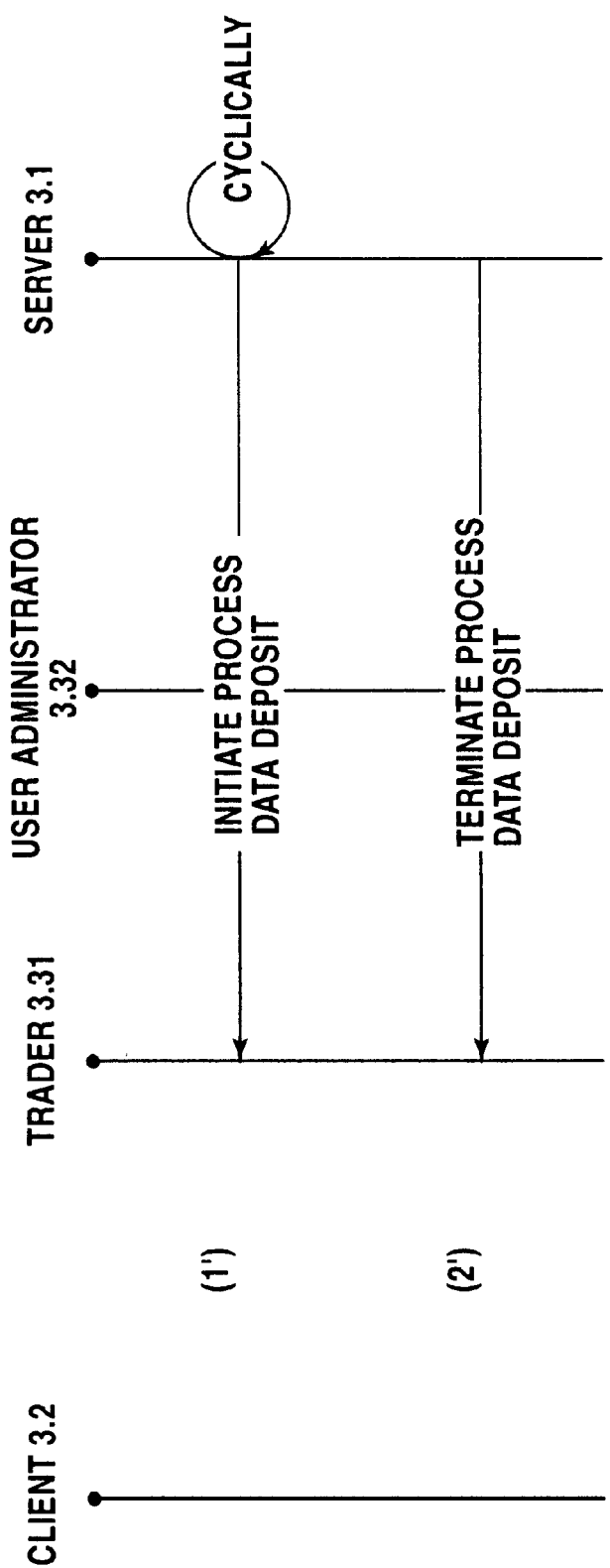
Figure 3:
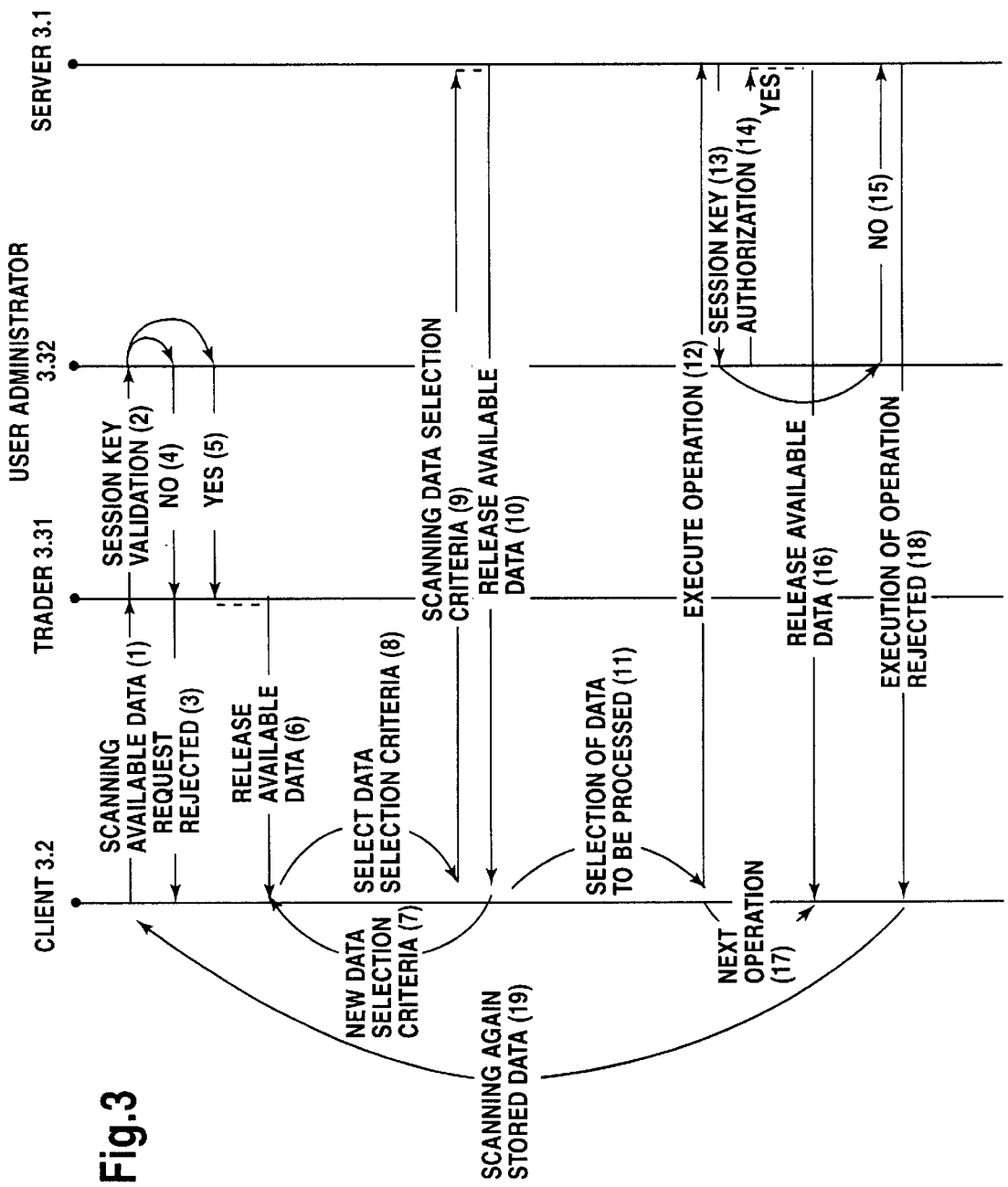

The invention is described in further detail with reference to figures, in which:

FIG. 1 shows the structure of a system which is suitable for carrying out the method, FIG. 2 shows the sequence within a plant during the start-up of the system, FIG. 3 shows the sequence during access to data and the performance of operations, FIG. 4 shows computer connections according to the prior art and FIG. 5 shows a system with data integration according to the prior art.

FIG. 1 shows, by way of example, the structure of a system which is suitable for carrying out the method according to the invention. In this system, computers or computer systems 2.1 to 2.7 communicate via a network 1. The computers 2.1 to 2.7 are also called nodes or local nodes in the text which follows.

The computers 2.1 to 2.7 can be allocated to different levels of an overall system, for example a process level, process control level or operations control level.

Some of the computers, for example 2.4 to 2.7, contain programs of one or more process management systems 4, while the other computers, for example 2.1 to 2.3 and 2.5, contain application programs 5. The computers 2.1 to 2.7 can contain both programs of the process management system 4 and application programs 5, as is shown, for example, by means of the computer 2.5.

Application programs 5 are understood to be programs for performing different tasks in the overall business process. To perform their task, they access process data provided by the process management system 4.

The method according to the invention relates to the exchange of process data, that is to say to the access of the application programs to process data which are made available in very different computer systems.

To perform this data exchange, a software system 3 having components 3.1 to 3.3, which is also called Process Information Broker PIB here, is distributed over the computers 2.1 to 2.7 of the system shown in FIG. 1.

The PIB system 3 is a software system with three types of component, namely a PIB server 3.1, a PIB client 3.2 and PIB services 3.3. It is possible for there to be a number of these components in a system. Only one set of PIB services 3.3 is required but, for reasons of redundancy, more than one set may be provided.

The PIB servers 3.1 and the PIB services 3.3 are independent programs, that is to say are not integral components of the process management systems 4. This achieves consistent separation of the process management systems 4 on one process management level from application programs S on levels above this.

In the text which follows, the tasks and functions of the components 3.1 to 3.3 will be explained in greater detail.

The PIB server 3.1 makes the process data of a process computer available locally or via the network 1, the process data being available in an orthogonalized form, that is to say formats and contents of the process data are transferred into a data structure independent of the process computer system. To consume these process data, interface functions which allow various operations on the process data are provided. The PIB server 3.1 contains all the logic necessary for procuring, administering and providing the process data.

The PIB services 3.3 make available a number of services which enable the application programs 5 to access the process data location-independently without having to know anything about the structure of the individual process computer systems and the storage location of the process data. This allows the implementation of various redundancy concepts in a simple manner. Furthermore, the services control the access and administer the users. To ensure reliable provision of service, the PIB services can be replicated in the system as many times as required. The PIB services 3.3 contain a switching service 3.31, called a trader here, and a user administrator 3.32, the functions of which will be explained below.

A PIB client 3.2 is a type of driver which enables any application program 5 to utilize interface functions which are independent of the process computer systems. The interface functions are served by the PIB servers and the PIB services. As a result, application programs 5 can access the required process data in a location-independent and controlled manner without having to know anything about the structure of the process computer systems.

To explain the dynamic characteristics of the PIB system, two basic aspects will be considered in detail in the text which follows, namely the start-up of a process computer, and thus the dynamic provision of the data, and the sequence of a directed and location-independent operation on process data by a client 3.2.

FIG. 2 shows the sequence within an overall system during the start-up. The vertical lines represent the components 3.1, 3.2, 3.31, 3.32 involved. The arrows between the components symbolize the directed actions between these components.

After the start-up, each PIB server 3.1 determines which process data "its" local node or computer, for example 2.4, can make available. These are not individual analog measured values or binary states (signals), but rather general types of process data such as, for example, "current process image".

The only configuration data of which the PIB server 3.1 is informed are those nodes, for example 2.1 and 2.6 in FIG. 1, in which there are PIB services 3.3. This manual configuration could be eliminated by means of an automated search process, although, for reasons of efficiency, this may not be expedient in very large networks in particular.

The available process data determined after the start-up are reported directly to all traders 3.1 by the PIB servers 3.1. This process is designated (1) in FIG. 2. The traders persistently store the available process data. This guarantees that the available process data are immediately available after the restart following failure of a computer on which a trader is running.

The PIB servers 3.1 in each case check the offered data of their computer and, if necessary, update them in all switching services 3.31 in the network. These processes are designated by (1) and (2). The client 3.2 and the user administrator 3.32 do not play any role during start-up.

Redundancy concepts are realized via a name concept of the offered process data. If the same name is used for offered process data, these are considered to be redundant. Only active offered process data may be affiliated, that is to say, in the redundancy case, only those which are operated in hot-standby mode. This assumes that the process computer system performs a surgeless switch-over.

To be able to execute an operation on process data, a client 3.2 must first register with the user administrator 3.32. The latter checks the access authorization of the client and returns a key, called a session key, to the client. This key accompanies the transmission with each further operation and is used for access control.

FIG. 3 shows the sequence of a complete operation from a "zero state". The vertical lines represent components 3.1, 3.2, 3.31, 3.32 of the overall system. The arrows between them symbolize the executed and directed operations. The dashed vertical lines symbolize asynchronous processes. All other operations are executed synchronously.

The sequence shown must be read as follows, the individual processes being designated by numbers in brackets. In a first process (1), a client interrogates the trader/switching service 3.31 for the list of stored data currently available in the network. The trader, in turn, has the user administrator check (2) a key also supplied during the inquiry. If the response of the user administrator is positive (5), the lists of the stored data and their associated addresses, that is to say name and storage location, are returned to the client 3.2 (6). If the response of the bus administrator 3.32 is negative (4), the job is rejected as non-executable (3).

For security reasons, the references supplied by the trader can be coded in such a manner that an address retrieved by another program cannot be used for the data access.

It is possible to execute operations on any of the returned stored data (9), (12). These operations are processed directly by means of the associated server, which can be addressed via the address supplied by the trader.

The first part of the operations supplies more detailed descriptions of the data of the respective stored data, for example the list of stored signals (9), (10). This does not involve another check of the access authorization.

This information can be used for executing operations such as reading or writing of data (12). Since operations such as the writing of data, for example setpoint inputs, are security-related, the key is checked again with each of these operations (13), (14), (15). This check is performed directly in the server addressed. The operations are only performed if the keys are valid (14), (16). If they are not, the execution of the operations is rejected (15), (18).

This mechanism makes it possible to introduce user profiles. For example, some of the users could be authorized only to read data whilst others could also be authorized to write data. Shifting this function into the network makes it possible to have centralized and uniform user administration and access control. Naturally, all steps of the access can be repeated as many times as desired (7), (17), (19).

We claim:

1. A method for a location-independent exchange of process data between application programs and process management systems for further processing the process data within a technical plant, the method which comprises:

coordinating, with a software system, a plurality of computer systems interconnected by a network and having process management systems and application programs;

converting process data from process-computer-specific data structures from each of the plurality of computer systems into process-computer-independent data structures available as stored data at an interface;

providing interface functions for permitting defined operations on the stored data in each of the plurality of computer systems;

registering and updating, with each of the plurality of computer systems, the process data converted into the stored data, including a storage location of the stored data, with a switching service; and providing the stored data to the application programs by the steps of:

ascertaining from the switching service available stored data types and their storage location;

selecting at least one of the stored data types; and executing operations on selected stored data types.

2. The method according to claim 1, which comprises:

using a Process Information Broker (PIB) system as the software system, the PIB system including a PIB server, PIB services having the switching service and at least one user administrator, and PIB clients;

providing the stored data and the interface functions with the PIB server;

controlling access to the stored data with the PIB services having the switching service and the at least one user administrator;

allocating the PIB clients to the application programs;

registering the PIB client with the user administrator for performing operations including reading and writing data;

checking, with the user administrator, access authorization of the PIB client and providing an authorization key to an authorized PIB client; and performing an intended operation with the PIB client having the authorization key.

3. The method according to claim 2, which comprises providing the PIB system with a plurality of the PIB services having user administrators for redundancy reasons, one of the user administrators functioning as a central user administrator and remaining user administrators performing a data comparison for taking over operational functions in case of a fault.

* * * * *